(12) United States Patent
Nakai

(10) Patent No.: US 8,355,322 B2
(45) Date of Patent: Jan. 15, 2013

(54) DATA COMMUNICATION SYSTEMS, RADIO BASE STATIONS, AND DATA COMMUNICATION METHODS

(75) Inventor: Masaki Nakai, Tokyo (JP)

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 13/124,675

(22) PCT Filed: Nov. 4, 2009

(86) PCT No.: PCT/JP2009/068823
§ 371 (c)(1),
(2), (4) Date: Apr. 18, 2011

(87) PCT Pub. No.: WO2010/067672
PCT Pub. Date: Jun. 17, 2010

(65) Prior Publication Data
US 2012/0034923 A1    Feb. 9, 2012

(30) Foreign Application Priority Data

Dec. 10, 2008  (JP) ................. 2008-314749

(51) Int. Cl.
*H04L 12/26* (2006.01)
*H04J 1/16* (2006.01)
*H04J 3/14* (2006.01)

(52) U.S. Cl. ..................................... 370/229

(58) Field of Classification Search .......... 370/329, 370/395.21, 395.32, 395.4, 395.7, 395.71, 370/229, 231, 235, 259; 398/174; 455/452.1, 455/18, 24
See application file for complete search history.

(56) References Cited

U.S. PATENT DOCUMENTS

2004/0213153 A1   10/2004  Nagato et al.
2010/0091692 A1    4/2010  Kashiwase

FOREIGN PATENT DOCUMENTS

| JP | 2000224231 A | 8/2000 |
| JP | 2003510988 A | 3/2003 |
| JP | 2003125443 A | 4/2003 |
| JP | 2004328157 A | 11/2004 |
| JP | 2006121180 A | 5/2006 |
| JP | 2008252324 A | 10/2008 |
| WO | 2007108131 A | 9/2007 |

OTHER PUBLICATIONS

Japanese Office Action for JP2010-542060 mailed on Jun. 19, 2012.
International Search Report for PCT/JP2009/068823 mailed Dec. 1, 2009.

*Primary Examiner* — Melody Mehrpour

(57) ABSTRACT

A radio base station transmits a communication channel establishment rejection signal that contains information that denotes that a delay transmission that transmits the data later is to be executed to the mobile station and registers an identifier of the mobile station to a list if the communication channel establishment request signal contains the information that denotes that the data is not instantaneous data and the radio resource does not have free space equal to or greater than the threshold, and transmits a call signal that contains information that denotes that execution of the delay transmission is to be started to a mobile station whose identifier has been registered to the list if the radio resource has free space equal to or greater than the threshold.

9 Claims, 4 Drawing Sheets

DATA COMMUNICATION SYSTEMS, RADIO BASE STATIONS, AND DATA COMMUNICATION METHODS

The present application is the National Phase of PCT/JP2009/068823, filed Nov. 4, 2009, which claims a priority based on Japanese Patent Application No. 2008-314749 filed on Dec. 10, 2008, the entire contents of which are incorporated herein by reference in its entirety.

TECHNICAL FIELD

The present invention relates to data communication systems, radio base stations, and data communication methods.

BACKGROUND ART

When a mobile station transmits some kind of data to a core network side, the mobile station issues a request for establishment of a data communication channel to a radio base station (refer to Patent Literature 1). At this point, if a radio resource (frequency bandwidth or the like) does not have free space for which a data communication channel can be established, the radio base station rejects the request for establishment of the data communication channel and then the mobile station tries to issue the request for establishment of the data communication channel at a predetermined period of time later.

RELATED ART LITERATURE

Patent Literature

Patent Literature 1: JP2006-121180A

SUMMARY OF THE INVENTION

Problems to be Solved by the Invention

However, the foregoing technique has the following problems.

(a) First Problem

Even if a mobile station is rejected the request for establishment of a data communication channel because the radio resource does not have free space, the mobile station retries to issue the request for establishment of the data communication channel again at a predetermined time period later. At this point, since the mobile station 1 tries to issue the request without checking whether or not the radio resource has free space, as a problem of the related art, it is likely that the radio resource will be wasted.

(b) Second Problem

Existing radio access networks have been created on the assumption that data that mobile stations transmit are data that is instantaneous data because mobile stations have been designed to be used as portable and voice communication telephone units.

In recent years, however, since mobile stations have been provided with sophisticated functions and the Internet network that exists beyond the core network as data communication targets has advanced, the need for transmitting large amounts of data (for example, video mail data) has been increasing. These types of data are not always data that is instantaneous data that need to be promptly transmitted.

However, even if data transmitted from mobile stations are data that is not instantaneous data, if the radio resource has free space for which a data communication channel can be established, not enough free space, the radio base station permits the request for establishment of a data communication channel.

As a result, the mobile station performs data communication at a low bit rate for a long time and battery power is depleted.

Therefore, an object of the present invention is to provide data communication systems, radio base stations, and data communication methods that can solve any of the foregoing problems.

Means that Solve the Problem

A data communication system according to the present invention is a data communication system having a radio base station connected to a network and a mobile station that establishes a communication channel with said network through said radio base station and performs data communication with said radio base station over a radio channel, wherein said mobile station includes:

data type informing means that transmits a communication channel establishment request signal that contains information that denotes that the data is not instantaneous data to said radio base station if said mobile station transmits data that is not instantaneous data, wherein said radio base station includes:

radio resource management means that determines whether or not a radio resource has free space equal to or greater than a threshold; and call control means that transmits a communication channel establishment rejection signal that contains information that denotes that a delay transmission that transmits the data later is to be executed to said mobile station and registers an identifier of the mobile station to a list if said communication channel establishment request signal contains the information that denotes that the data is not instantaneous data and the radio resource does not have free space equal to or greater than said threshold, and that transmits a call signal that contains information that denotes that execution of said delay transmission is to be started to a mobile station whose identifier has been registered to said list if the radio resource has free space equal to or greater than said threshold, and wherein said mobile station further includes:

delay transmission means that transmits said communication channel establishment request signal to said radio base station again and starts transmitting data that is not instantaneous data if said call signal contains the information that denotes that the execution of said delay transmission is to be started.

A radio base station according to the present invention is a radio base station that is connected to a network and that performs data communication over a radio channel with a mobile station to which a communication channel has been established to said network through said radio base station, comprising:

radio resource management means that determines whether or not a radio resource has free space equal to or greater than a threshold; and call control means that transmits a communication channel establishment rejection signal that contains information that denotes that a delay transmission that transmits the data later is to be executed to said mobile station and registers an identifier of the mobile station to a list if a communication channel establishment request signal received from said mobile station contains information that denotes that the data is not instantaneous data and the radio resource does not have free space equal to or greater than said threshold, and that transmits a call signal that contains information that denotes that execution of said delay transmission is to be started to a mobile station whose identifier has been registered to said list if the radio resource has free space equal to or greater than said threshold.

A data communication method according to the present invention is a data communication method for a radio base station that is connected to a network and that performs data communication over a radio channel with a mobile station to which a communication channel has been established to said network through said radio base station, comprising:

a step that determines whether or not a radio resource has free space equal to or greater than a threshold;

a step that transmits a communication channel establishment rejection signal that contains information that denotes that a delay transmission that transmits the data later is to be executed to said mobile station and registers an identifier of the mobile station to a list if a communication channel establishment request signal received from said mobile station contains information that denotes that the data is not instantaneous data and the radio resource does not have free space equal to or greater than said threshold; and a step that transmits a call signal that contains information that denotes that execution of said delay transmission is to be started to a mobile station whose identifier has been registered to said list if the radio resource has free space equal to or greater than said threshold.

Effects of the Invention

According to the present invention, the following effects can be provided.

(A) A first effect is to improve the use efficiency of the radio resource. The reason is that if the radio resource does not have enough free space and the radio channel is busy, data that is not instantaneous data are controlled such that they are held, not transmitted and after the radio resource has enough free space and traffic congestion subsides, the data are transmitted.

(B) A second effect is to be able to save the battery power of a mobile station when large capacity data are transmitted. The reason is that since data that is not instantaneous data such as large capacity data are controlled such that they are transmitted after the radio resource has enough free space and traffic congestion subsides, a period of time for which a communication channel is established can be shortened.

MODES THAT CARRY OUT THE INVENTION

In the following, with reference to drawings, best modes that carry out the present invention will be described.

First Exemplary Embodiment

Figure 1:
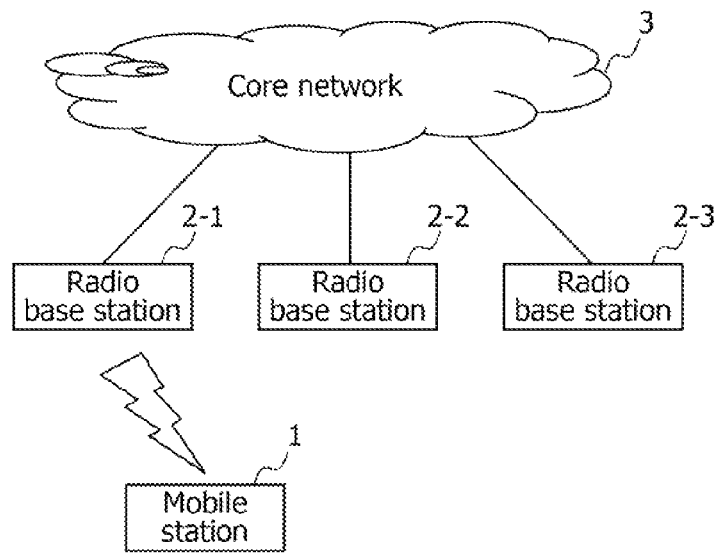
FIG. 1 is a schematic diagram showing a structure of a data communication system according to an exemplary embodiment of the present invention.

With reference to FIG. 1, a structure of a data communication system according to this exemplary embodiment will be described.

Referring to FIG. 1, the data communication system according to this exemplary embodiment has mobile station 1, radio base stations 2-1~2-3, and core network 3.

It should be noted that for simple explanation, FIG. 1 shows one mobile station 1 and three radio base stations 3; however, the number of mobile stations 1 and the number of radio base stations 2 are not limited thereto.

Mobile station 1 freely moves in a service area of core network 3 and performs data communication over a radio channel with radio base stations 2-1~2-3. When mobile station 1 performs data communication, it establishes a data communication channel with core network 3 through radio base station 2 to which a cell, in which mobile station 1 is located, belongs.

Radio base stations 2-1~2-3 not only perform data communication over a radio channel with mobile station 1, but also perform data communication over a cable with a node (not shown) of core network 3.

Next, with reference to FIG. 2, a structure of each of radio base stations 2-1~2-3 will be described. In this part, although the structure of radio base station 2-1 will be described, this structure is the same as those of other radio base stations 2-2 and 2-3.

Figure 2:
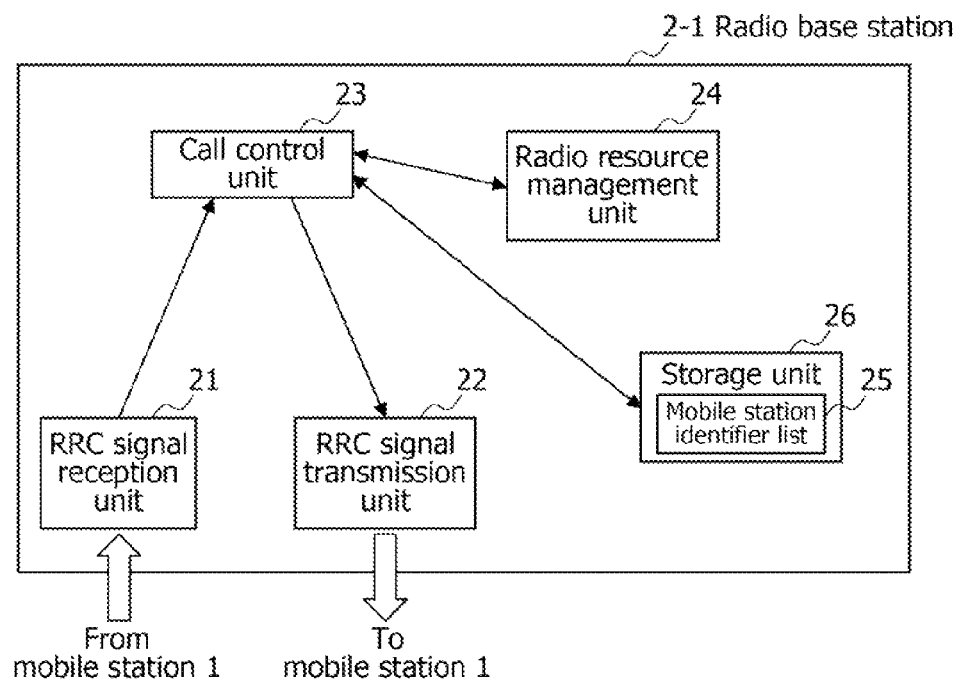
FIG. 2 is a block diagram showing a structure of a radio base station shown in FIG. 1.

Referring to FIG. 2, radio base station 2-1 has RRC signal reception unit 21 that receives a control signal as a RRC signal from mobile station 1; RRC signal transmission unit 22 that transmits a control signal as an RRC signal to mobile station 1; call control unit 23 that performs an overall call control; radio resource management unit 24 that manages the congestion state of a radio resource that a radio control station (not shown) as a highly hierarchical station can use; and storage unit 26 that stores mobile station identifier list 25 that itemizes identifiers of mobile stations 1 that waits for establishment of a data communication channel.

FIG. 2 only shows a functional unit that relates to data communication over a radio channel with mobile station 1 in functional units of radio base stations 2, another functional units are omitted.

In this part, the operation of the functional unit of data communication of radio base station 2-1 will be described in detail.

RRC signal reception unit 21 receives a data communication channel establishment request signal as an RRC signal from mobile station 1 and informs call control unit 23 of an identifier of mobile station 1 and content of the data communication channel establishment request signal.

Radio resource management unit 24 checks whether or not the radio resource has enough free space for which a large amount data can be transmitted and informs call control unit 23 of the result. The determination of whether or not the radio resource has enough free space is performed on the basis of whether the radio resource has free space equal to or greater than a threshold designated as an amount of the radio resource for which large capacity data can be transmitted. This threshold is greater than the amount of the radio resource for which a data communication channel can be established.

Call control unit 23 determines whether or not to accept a call, namely permit the data communication channel establishment request, based on content of the data communication channel establishment request signal informed from RRC signal reception unit 21 and the checked result informed from radio resource management unit 24 and causes RRC signal transmission unit 22 to transmit a data communication channel establishment permission signal or a data communication channel establishment rejection signal based on the determined result.

RRC signal transmission unit 22 transmits the data communication channel establishment permission signal or data communication channel establishment rejection signal as caused by call control unit 23 as an RRC signal to mobile station 1.

More specifically, if the type of data that mobile station 1 tries to transmit is data that is not instantaneous data, "data enabled for delay transmission" that represents the type of data has been set for a cause parameter (transmission cause parameter) in the data communication channel establishment request signal.

Thus, when call control unit 23 determines whether or not to establish a data communication channel, if the radio resource does not have enough free space for which a large amount data can be transmitted and "data enabled for delay transmission" has been set for the data communication channel establishment request signal, call control unit 23 rejects the data communication channel establishment request at that point so that call control unit 23 delays the transmission of the data and transmits the data when the radio resource has enough free space later (hereinafter this operation is referred to as the delay transmission). Thus, mobile station 1 enters into a data communication channel establishment waiting state.

In this case, call control unit 23 appends an identifier of mobile station 1 that has entered into the data communication channel establishment waiting state to mobile station identifier list 25 and causes RRC signal transmission unit 22 to transmit the data communication channel establishment rejection signal having the cause parameter for which "execution of delay transmission" that denotes that data are to be transmitted with a delay has been set.

When the radio resource has enough free space, call control unit 23 extracts an identifier from mobile station identifier list 25 and causes RRC signal transmission unit 22 to transmit a paging signal that pages mobile station 1 having the extracted identifier and that has a cause parameter for which "start of delay transmission" that denotes that the execution of the delay transmission is to be started has been set.

Mobile station 1 has a functional unit (not shown) that determines whether or not data that the user tires to transmit are data that is instantaneous data and sets "data enabled for delay transmission" for the cause parameter in the data communication channel establishment request signal if the data is not instantaneous data (this functional unit corresponds to data type informing means) and a functional unit (not shown) that starts transmitting data that have been stored and is not instantaneous data if "start of delay transmission" has been set for the cause parameter in the paging signal (this functional unit corresponds to delay transmission means).

In the following, an operation of the data communication system according to this exemplary embodiment will be described.

(1) First Exemplary Operation

This exemplary operation is one in which when mobile station 1 is located in the cell of radio base station 2-1, mobile station 1 enters into the data communication channel establishment waiting state and does not move from the cell. With reference to a flow chart shown in FIG. 3, this exemplary operation will be described.

Figure 3:
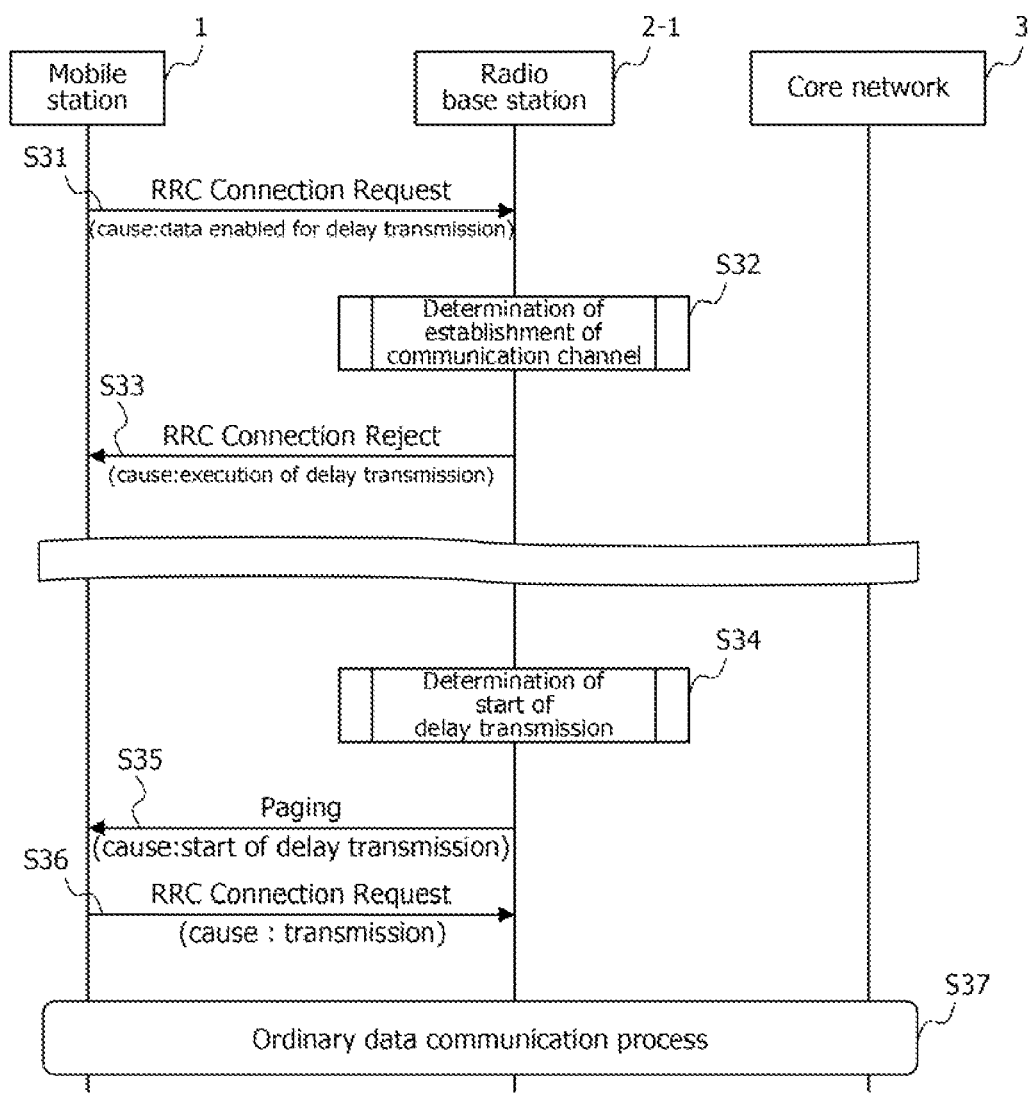
FIG. 3 is a flow chart describing an example of an overall operation of the data communication system shown in FIG. 1.

Referring to FIG. 3, when mobile station 1 performs data communication, if data that the user tires to transmit is not instantaneous data, mobile station 1 sets "data enabled for delay transmission" for a cause parameter in an RRC Connection Request signal that is the data communication channel establishment request signal and transmits the resultant signal to radio base station 2-1 at step S31.

Thereafter, radio base station 2-1 determines whether or not to permit the data communication channel establishment request (referred to as the determination of establishment of communication channel) at step S32. When performing the determination of establishment of communication channel, first of all, radio resource management unit 24 checks whether or not the radio resource has enough free space to allow for the transmission of large capacity data. Thereafter, call control unit 23 determines whether or not to permit the data communication channel establishment request based on the state of the radio resource checked by radio resource management unit 24 and the content of the RRC Connection Request signal. If "data enabled for delay transmission" has been set for the RRC Connection Request signal and the radio resource does not have enough free space, call control unit 23 rejects the data communication channel establishment request at this point so as to execute the delay transmission later. Thereafter, call control unit 23 appends the identifier of mobile station 1 to mobile station identifier list 25 and transmits the RRC Connection Reject signal that is the data communication channel establishment rejection signal to mobile station 1 at step S33. At this point, call control unit 23 sets "execution of delay transmission" for the cause parameter in the RRC Connection Rejection Signal and informs mobile station 1 that the delay transmission is to be executed.

Thus, mobile station 1 does not retry to issue the data communication channel establishment request, enters into the data communication channel establishment waiting state, and waits for paging from radio base station 2-1 (paging signal).

Thereafter, radio base station 2-1 determines whether or not to start executing the delay transmission at constant intervals at step S34 (referred to as the determination of start of delay transmission). When performing the determination of start of delay transmission, first of all, radio resource management unit 24 checks whether or not the radio resource has enough free space to allow for the transmission of large capacity data and then call control unit 23 determines whether or not to start the delay transmission based on the state of the radio resource checked by radio resource management unit 24 and content of mobile station identifier list 25. If the radio resource has enough free space and an identifier has been registered to mobile station identifier list 25, call control unit 23 decides to start the delay transmission. Thereafter, call control unit 23 extracts one identifier from mobile station identifier list 25 and transmits a paging signal to mobile station 1 having the identifier at step S35. At this point, call control unit 23 sets "start of delay transmission" for a cause parameter in the paging signal and informs mobile station 1 that the execution of the delay transmission is to be started.

Thus, mobile station 1 transmits the RRC Connection Request signal having the cause parameter for which "transmission" that denotes that the transmission of data is to be started to radio base station 2-1 at step S36.

Thereafter, mobile station 1 performs an ordinary data communication process to transmit data that have been held and that is not instantaneous data to core network 3 at step S37.

With reference to a flow chart shown in FIG. 4, the determination of establishment of communication channel at step S32 of this explanatory operation will be described in detail.

Figure 4:
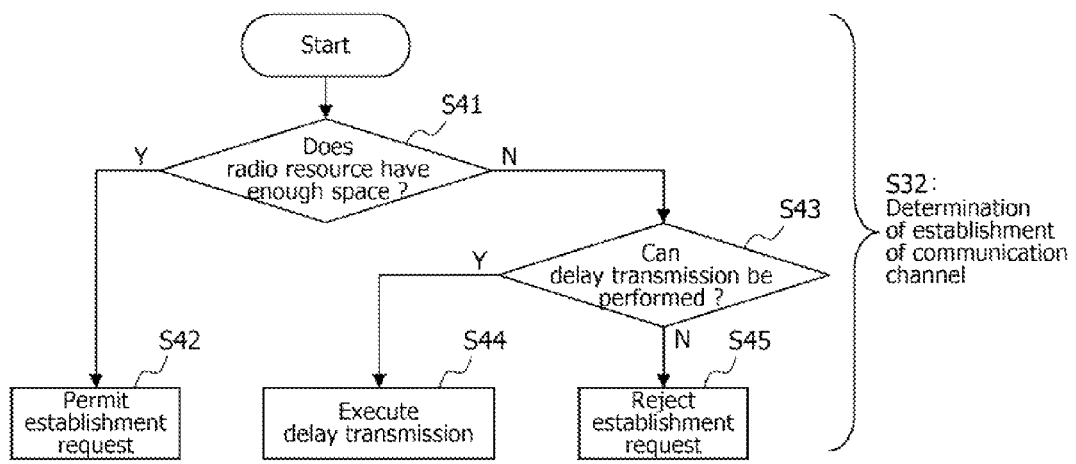
FIG. 4 is a flow chart describing an example of step S32 shown in FIG. 3.

Referring to FIG. 4, first of all, radio resource management unit 24 checks whether or not the radio resource has enough free space to allow for the transmission of large capacity data at step S41.

If the radio resource has enough free space, call control unit 23 permits the data communication channel establishment request at step S42.

In contrast, if the radio resource does not have enough free space, call control unit 23 checks whether or not "data enabled for delay transmission" has been set for the cause parameter in the RRC Connection Request signal at step S43.

If "data enabled for delay transmission" has been set, call control unit 23 decides to execute the delay transmission at step S44; if not, call control unit 23 rejects the data communication channel establishment request at step S45.

With reference to a flow chart shown in FIG. 5, the determination of start of delay transmission at step S34 of this exemplary operation will be described in detail.

Figure 5:
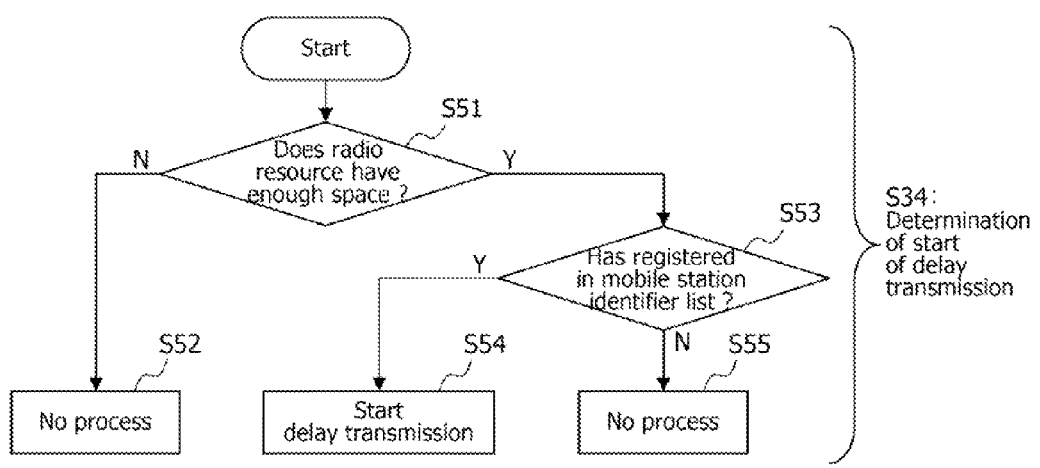
FIG. 5 is a flow chart describing an example of step S34 shown in FIG. 3.

Referring to FIG. 5, radio resource management unit 24 checks whether or not the radio resource has enough free space to allow for the transmission of large capacity data at constant intervals at step S51.

If the radio resource does not have enough free space, call control unit 23 decides not to start the delay transmission at step S52.

In contrast, if the radio resource has enough free space, call control unit 23 checks whether or not an identifier has been registered to mobile station identifier list 25 at step S53.

If an identifier has not been registered, call control unit 23 decides not to start the delay transmission at step S55; if registered, call control unit 23 extracts one identifier from mobile station identifier list 25 and decides to start executing the delay transmission to mobile station 1.

In this exemplary operation, if the radio resource does not have enough free space, radio base station 2-1 causes mobile station 1 to hold data that is not instantaneous data such as large capacity data and to start transmitting them after the radio resource has enough free space.

Thus, the use efficiency of the radio resource can be improved. In addition, since mobile station 1 can shorten a period of time for which a data communication channel is established when mobile station 1 transmits large capacity data, the power of the battery of mobile station 1 can be saved.

(2) Second Exemplary Operation

This exemplary operation is one in which when mobile station 1 is located in the cell of radio base station 2-1, mobile station 1 enters into the data communication channel establishment waiting state, and while mobile station 1 is performing communication of data that is instantaneous data such as voice data, mobile station 1 moves from the cell of radio base station 2-1 to a cell of another radio base station 2-2. With reference to a flow chart shown in FIG. 6, this exemplary operation will be described.

Figure 6:
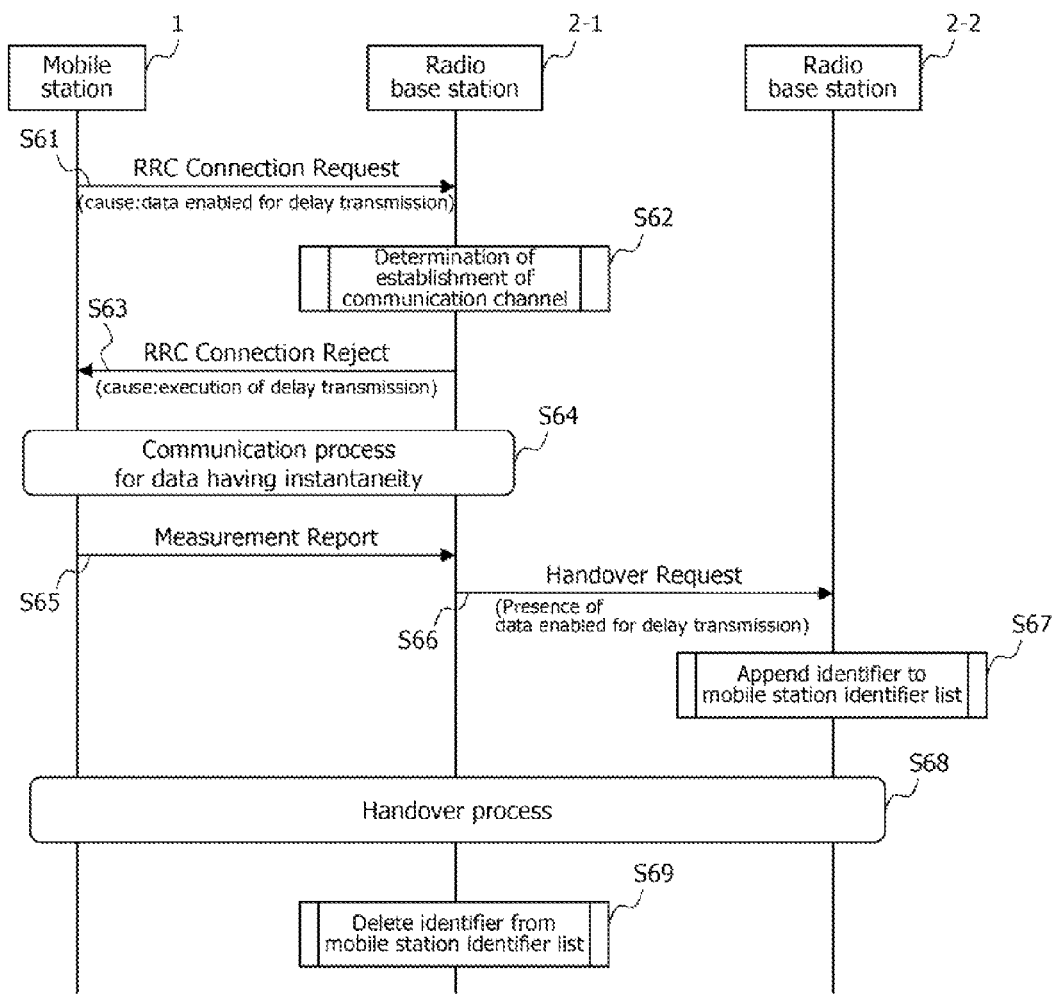
FIG. 6 is a flow chart describing another example of the overall operation of the data communication system shown in FIG. 1.

Referring to FIG. 6, a process of steps S61 to S63 that are similar to those of steps S31 to S33 shown in FIG. 3 is performed. Thus, an identifier of mobile station 1 is registered to mobile station identifier list 25 of radio base station 2-1 and then mobile station 1 enters into the data communication channel establishment waiting state.

Then, when mobile station 1 issues the data communication channel establishment request so as to transmit data that is instantaneous data, radio base station 2-1 permits the data communication channel establishment request and performs data communication at step S64.

Thereafter, mobile station 1 transmits a Measurement Report signal that is a radio quality measurement result report signal to radio base station 2-1 at step S65.

When call control unit 23 of radio base station 2-1 determines that mobile station 1 has exited from the cell of radio base station 2-1 and has approached the cell of radio base station 2-2 on the basis of content of the Measurement Report signal received from mobile station 1, call control unit 23 of radio base station 2-1 transmits a Handover Request signal that is a handover request signal to radio base station 2-2 at step S66. At this point, call control unit 23 of radio base station 2-1 sets "presence of data enabled for delay transmission" that denotes that mobile station 1 has held data to be delay-transmitted for a parameter in the Handover Request signal and informs radio base station 2-2 of the resultant signal.

Then, call control unit 23 of radio base station 2-2 appends an identifier of mobile station 1 to mobile station identifier list 25 at step S67 and performs a handover process to hand over a radio termination process of mobile station 1 from radio base station 2-1 at step S68.

After completion of the handover process, call control unit 23 of radio base station 2-1 deletes the identifier of mobile station 1 from mobile station identifier list 25 at step S69.

In this exemplary operation, if mobile station 1 whose identifier has been registered to mobile station identifier list 25 hands over, radio base station 2-1 informs radio base station 2-2, that becomes a destination base station, that mobile station 1 has held data that are to be delay-transmitted.

Thus, radio base station 2-2 can hand over the process in which mobile station 1 delay-transmits data from radio base station 2-1 that is a source base station.

(3) Third Exemplary Operation

This exemplary operation is an operation in which when mobile station 1 that is located in the cell of radio base station 2-1 enters into the data communication channel establishment waiting state and moves from the cell to another cell while keeping in the establishment waiting state.

In this case, immediately after mobile station 1 moves to the other cell, mobile station 1 transmits the RRC Connection Request signal having the cause parameter for which "data enabled for delay transmission" have been set to the radio base station to which the destination cell belongs.

Thereafter, the operations will be branched off into the following four cases.

(3-1) A case in which the destination cell belongs to radio base station 2-1 that is the same as one to which the source cell belongs and the radio resource of the destination cell has enough free space:

In this case, call control unit 23 of radio base station 2-1 permits the data communication channel establishment request and then mobile station 1 performs an ordinary data communication process to start transmitting data that have been held and that is not instantaneous data. In addition, call control unit 23 of radio base station 2-1 deletes the identifier of mobile station 1 from mobile station identifier list 25.

(3-2) A case in which the destination cell belongs to radio base station 2-1 that is the same as one to which the source cell belongs and the radio resource of the destination cell does not have enough free space:

In this case, call control unit 23 of radio base station 2-1 rejects the data communication channel establishment request and transmits the RRC Connection Request signal having the cause parameter for which "execution of delay transmission" is set to mobile station 1. Thus, mobile station 1 does not retry to issue the data communication channel establishment request, enters into the data communication channel establishment waiting state, and waits for a paging signal from radio base station 2-1.

In this case, if the identifier of mobile station 1 has been registered to mobile station identifier list 25, the identifier is not registered again.

(3-3) A case in which the destination cell belongs to radio base station 2-2 that is different from one to which the source cell belongs and the radio resource of the destination cell has enough free space:

In this case, call control unit 23 of radio base station 2-2 permits the data communication channel establishment request and then mobile station 1 performs an ordinary data communication process to start transmitting data that have been held and that is not instantaneous data.

(3-4) A case in which the destination cell belongs to radio base station 2-2 that is different from one to which the source cell belongs and the radio resource of the destination cell does not have enough free space:

In this case, call control unit 23 of radio base station 2-2 rejects the data communication channel establishment request and transmits the RRC Connection Request signal having the cause parameter for which "execution of delay transmission" is set to mobile station 1. Thus, mobile station 1 does not retry issuing the data communication channel establishment request, enters into the data communication channel establishment waiting state, and waits for the paging signal from radio base station 2-2. In addition, call control unit 23 of radio base station 2-2 registers the identifier of mobile station 1 to mobile station identifier list 25.

Like the foregoing cases 3-3 and 3-4, if the destination cell belongs to radio base station 2-2 that is different from one to which the source cell belongs, the identifier of mobile station 1 that is not located in the cell of radio base station 2-1 remains in mobile station identifier list 25 that radio base station 2-1 to which the source cell belongs has held. Thus, after call control unit 23 of radio base station 2-1 calls mobile station 1 using the paging signal, if mobile station 1 does not respond for a predetermined period of time, call control unit 23 deletes the identifier of mobile station 1 from mobile station identifier list 25.

When the above cases are summarized, they can be categorized as listed in Table 1 that follows depending on whether a radio base station to which the source cell belongs is the same as or different from one to which the destination cell belongs or whether the radio resource of the destination cell has enough free space.

TABLE I

|  | Radio resource of destination cell has free space | Radio resource of destination cell does not have free space |
|---|---|---|
| Radio base station to which source cell belongs is the same as one to which destination cell belongs. | Radio base station executes data communication process and deletes identifier of mobile station 1 from mobile station identifier list. | If identifier of mobile station 1 has been registered to mobile station identifier list, radio base station does not register it again. |
| Radio base station to which source cell belongs is different from one to which destination cell belongs. | Radio base station to which destination cell belongs executes data communication process. | Radio base station to which destination cell belongs registers identifier of mobile station 1 to mobile station identifier list. |

(4) Fourth Exemplary Operation

This exemplary operation is one in which when mobile station 1 is located in the cell of radio base station 2-1, mobile station 1 enters into the data communication channel establishment waiting state, the power is temporarily turned off while keeping the establishment waiting state, and then the power is turned on again.

In this case, after mobile station 1 completes an attach process with radio base stations 2 in which mobile station 1 is located when the power is turned on, mobile station 1 transmits the RRC Connection Request signal having the cause parameter for which "data enabled for delay transmission" is set to radio base stations 2 again.

The rest of the steps of the operation are the same as those after step S32 shown in FIG. 3.

Second Exemplary Embodiment

This exemplary embodiment is the same as the first exemplary embodiment in structure except that when mobile station 1 transmits data that is not instantaneous data, the RRC Connection Request signal has not only the cause parameter for which "data enabled for delay transmission" is set, but also the amount of the data.

In this exemplary embodiment, radio resource management unit 24 of radio base station 2-1 increases or decreases the threshold on which it is determined whether or not the radio resource has free space when radio resource management unit 24 performs the determination of establishment of communication channel at step S32 and the determination of start of delay transmission at step S34. Specifically, the threshold is increased in proportion to the amount of data and the delay transmission is started after the radio resource has enough free space.

Now, with reference to the exemplary embodiments, the present invention has been described. However, it should be understood by those skilled in the art that the structure and details of the present invention may be changed in various manners without departing from the scope of the present invention.

INDUSTRIAL APPLICABILITY

It can be contemplated that the present invention is used for an application that effectively uses a few radio bandwidths without adjusting data transmission timings between individual measurement instruments in a system that transmits measurement data from any stationary measurement instrument using a radio channel as well as an application in which a large capacity of data that is not instantaneous data such as video mail from a mobile station such as a cellular phone.

The invention claimed is:

1. A data communication system having a radio base station connected to a network and a mobile station that establishes a communication channel with said network through said radio base station and performs data communication with said radio base station over a radio channel,
   wherein said mobile station includes:
   data type informing unit that transmits a communication channel establishment request signal that contains information that denotes that the data is not instantaneous data to said radio base station if said mobile station transmits data that is not instantaneous data,
   wherein said radio base station includes:
   radio resource management unit that determines whether or not a radio resource has free space equal to or greater than a threshold; and
   call control unit that transmits a communication channel establishment rejection signal that contains information that denotes that a delay transmission that transmits the data later is to be executed to said mobile station and registers an identifier of the mobile station to a list if said communication channel establishment request signal contains the information that denotes that the data is not instantaneous data and the radio resource does not have free space equal to or greater than said threshold, and that transmits a call signal that contains information that denotes that execution of said delay transmission is to be started to a mobile station whose identifier has been registered to said list if the radio resource has free space equal to or greater than said threshold, and wherein said mobile station further includes:

delay transmission unit that transmits said communication channel establishment request signal to said radio base station again and starts transmitting data that is not instantaneous data if said call signal contains the information that denotes that the execution of said delay transmission is to be started.

2. The data communication system as set forth in claim 1, wherein said call control unit transmits a handover request signal that contains information that denotes that the mobile station has held data that is not instantaneous data to a destination base station and deletes an identifier of the mobile station from said list after said destination base station completes the handover process, if said radio base station becomes a source base station from which a mobile station whose identifier has been registered to said list hands over, and wherein said call control unit means registers an identifier of the mobile station to the list and performs a handover process, if said radio base station becomes a destination base station and if said handover request signal contains information that denotes that said mobile station has held data that is not instantaneous data.

3. The data communication system as set forth in claim 1, wherein said data type informing unit also causes information that represents an amount of the data to be contained in said communication channel establishment request signal if data that is not instantaneous data are transmitted, and wherein said call control unit increases or decreases said threshold according to the information that represents the amount of data contained in said communication channel establishment request signal.

4. A radio base station that is connected to a network and that performs data communication over a radio channel with a mobile station to which a communication channel has been established to said network through said radio base station, comprising:

radio resource management unit that determines whether or not a radio resource has free space equal to or greater than a threshold; and call control unit that transmits a communication channel establishment rejection signal that contains information that denotes that a delay transmission that transmits the data later is to be executed to said mobile station and registers an identifier of the mobile station to a list if a communication channel establishment request signal received from said mobile station contains information that denotes that the data is not instantaneous data and the radio resource does not have free space equal to or greater than said threshold, and that transmits a call signal that contains information that denotes that execution of said delay transmission is to be started to a mobile station whose identifier has been registered to said list if the radio resource has free space equal to or greater than said threshold.

5. The radio base station as set forth in claim 4, wherein said call control unit transmits a handover request signal that contains information that denotes that the mobile station has held data that is not instantaneous data to a destination base station and deletes an identifier of the mobile station from said list after said destination base station completes the handover process, if said radio base station becomes a source base station from which a mobile station whose identifier has been registered to said list hands over, and wherein said call control unit registers an identifier of the mobile station to the list and performs the handover process, if said radio base station becomes the destination base station and if said handover request signal received from the source radio base station contains information that denotes that said mobile station has held data that is not instantaneous data.

6. The radio base station as set forth in claim 4, wherein said call control unit increases or decreases said threshold according to information that represents an amount of data if said communication channel establishment request signal contains both information that denotes that data is not instantaneous data and the information that represents the amount of the data.

7. A data communication method for a radio base station that is connected to a network and that performs data communication over a radio channel with a mobile station to which a communication channel has been established to said network through said radio base station, comprising:

a step that determines whether or not a radio resource has free space equal to or greater than a threshold;

a step that transmits a communication channel establishment rejection signal that contains information that denotes that a delay transmission that transmits the data later is to be executed to said mobile station and registers an identifier of the mobile station to a list if a communication channel establishment request signal received from said mobile station contains information that denotes that the data is not instantaneous data and the radio resource does not have free space equal to or greater than said threshold; and a step that transmits a call signal that contains information that denotes that execution of said delay transmission is to be started to a mobile station whose identifier has been registered to said list if the radio resource has free space equal to or greater than said threshold.

8. The data communication method as set forth in claim 7, further comprising:

a step that transmits a handover request signal that contains information that denotes that the mobile station has held data that is not instantaneous data to a destination base station and deletes an identifier of the mobile station from said list after said destination base station completes the handover process, if said radio base station becomes a source base station from which a mobile station whose identifier has been registered to said list hands over, and a step that registers an identifier of the mobile station to the list and performs the handover process, if said radio base station becomes the destination base station and if said handover request signal received from the source radio base station contains information that denotes that said mobile station has held data that is not instantaneous data.

9. The data communication method as set forth in claim 7, further comprising:

a step that increases or decreases said threshold according to information that represents an amount of data if said communication channel establishment request signal contains both information that denotes that data is not instantaneous data and the information that represents the amount of the data.

* * * * *